United States Patent
Öhman et al.

(10) Patent No.: US 10,870,352 B2
(45) Date of Patent: Dec. 22, 2020

(54) METHOD FOR CONTROLLING A SAFETY SYSTEM IN A VEHICLE USING AN ELECTRIC ROAD SYSTEM

(71) Applicant: VOLVO TRUCK CORPORATION, Gothenburg (SE)

(72) Inventors: Mikaela Öhman, Gothenburg (SE); Richard Sebestyen, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 199 days.

(21) Appl. No.: 15/777,760

(22) PCT Filed: Dec. 18, 2015

(86) PCT No.: PCT/EP2015/080445
§ 371 (c)(1),
(2) Date: May 21, 2018

(87) PCT Pub. No.: WO2017/102024
PCT Pub. Date: Jun. 22, 2017

(65) Prior Publication Data
US 2018/0345794 A1  Dec. 6, 2018

(51) Int. Cl.
*B60L 9/00* (2019.01)
*G05D 1/00* (2006.01)
(Continued)

(52) U.S. Cl.
CPC ............... *B60L 3/0015* (2013.01); *B60L 5/04* (2013.01); *B60L 5/36* (2013.01); *B60L 53/14* (2019.02);
(Continued)

(58) Field of Classification Search
CPC .......... B60L 3/0015; B60L 53/14; B60L 5/04; B60L 5/36; B60M 7/003; B60W 30/09
(Continued)

(56) References Cited

U.S. PATENT DOCUMENTS

2005/0107955 A1  5/2005  Isaji et al.
2007/0278059 A1  12/2007  Afriat
(Continued)

FOREIGN PATENT DOCUMENTS

CN   104228831 A   * 12/2014
EP   1488961 A1     12/2004
(Continued)

OTHER PUBLICATIONS

English Translation for WO2010076976A2.*
(Continued)

*Primary Examiner* — Mahmoud S Ismail
(74) *Attorney, Agent, or Firm* — Venable LLP; Jeffri A. Kaminski (57) ABSTRACT

A method is provided for controlling a vehicle safety system in a vehicle provided with a current collector arranged to transmit electric power from a current conductor in the surface of a road. The current collector is controllable for vertical and transverse displacement relative to a longitudinal axis of the vehicle to contact and track the current conductor. The method involves performing the steps of detecting that an obstacle is located in the path of the current collector; transmitting data from the forward looking data collecting system to the electronic control unit; performing an object classification to determine a damage level for the dynamic charging system; determining an action to be taken by the safety system based on the determined damage level; and initiating the action in dependence of at least the determined damage level.

13 Claims, 7 Drawing Sheets

(51) Int. Cl.
*G05D 3/00* (2006.01)
*G06F 7/00* (2006.01)
*G06F 17/00* (2019.01)
*B60L 3/00* (2019.01)
*B60L 5/04* (2006.01)
*B60M 7/00* (2006.01)
*B60L 5/36* (2006.01)
*B60L 53/14* (2019.01)
*B60W 30/09* (2012.01)
*B60L 5/38* (2006.01)

(52) U.S. Cl.
CPC ............ *B60M 7/003* (2013.01); *B60W 30/09* (2013.01); *B60L 5/38* (2013.01); *B60L 2250/10* (2013.01); *B60L 2250/16* (2013.01); *B60M 2200/00* (2013.01); *B60W 2554/00* (2020.02); *Y02T 10/70* (2013.01); *Y02T 10/7072* (2013.01); *Y02T 90/14* (2013.01)

(58) Field of Classification Search
USPC ............................................ 701/22; 340/435
See application file for complete search history.

(56) References Cited

U.S. PATENT DOCUMENTS

| | | |
|---|---|---|
| 2009/0192710 A1 | 7/2009 | Eidehall et al. |
| 2010/0114490 A1 | 5/2010 | Becker |
| 2012/0018692 A1 | 1/2012 | Langenwalter |
| 2013/0025989 A1 | 1/2013 | Asplund |
| 2013/0025990 A1 | 1/2013 | Asplund |
| 2016/0101779 A1* | 4/2016 | Katoh ................ G06K 9/00791 340/435 |
| 2018/0374352 A1* | 12/2018 | Matsunaga ......... B60T 8/17558 |

FOREIGN PATENT DOCUMENTS

| | | | |
|---|---|---|---|
| EP | 2298626 A1 | 3/2011 | |
| JP | H09-023503 A | 1/1997 | |
| JP | 2001128304 A | 5/2001 | |
| JP | 2004-161191 A | 6/2004 | |
| JP | 2008-150205 A | 7/2008 | |
| JP | 2008-279898 A | 11/2008 | |
| JP | 2012-519104 A | 8/2012 | |
| WO | 2010076976 A2 | 7/2010 | |
| WO | WO-2010076976- 2 * | 7/2010 | ............. B60M 1/36 |
| WO | 2010/098547 A2 | 9/2010 | |
| WO | 2012134383 A1 | 10/2012 | |

OTHER PUBLICATIONS

English Translation for CN104228831A.*
International Search Report (dated Aug. 18, 2016) for corresponding International App. PCT/EP2015/080445.
Japanese Office Action dated Jan. 7, 2020 in corresponding JP Application No. 2018-531535, 9 pages.

* cited by examiner

METHOD FOR CONTROLLING A SAFETY SYSTEM IN A VEHICLE USING AN ELECTRIC ROAD SYSTEM

BACKGROUND AND SUMMARY

The invention relates to a method for controlling a safety system in a vehicle using an electric road system (ERS) and a vehicle operated using this method.

The invention can be applied in vehicles, such as trucks, buses, cars and construction equipment. Although the invention will be described with respect to a commercial vehicle, the invention is not restricted to this particular vehicle, but may also be used in heavy-duty vehicles such as working machines in the form of articulated haulers.

Vehicles travelling on an electric road system (ERS) are provided with a current collector arranged to transmit electric power from a current conductor located in the road surface to the vehicle for driving the vehicle or for charging an electrical storage means, such as a high voltage battery onboard the vehicle. The current conductor is a charging surface that can comprise a pair of parallel tracks extending along the electric road, which tracks can supply direct current (DC) to the vehicle via the current collector.

Vehicles of this type can be provided with tracking means to allow the current collector to track and follow the current conductor. The vehicle can be steered by a driver who will need to maintain a relatively steady course along the road, as the tracking means has a limited transverse displacement range. This requires the driver to concentrate on lane keeping which can be tiresome and tedious over a longer distance. Alternatively the vehicle can be steered by a suitable autonomous lane keeping means to maintain a desired course along the electric road. A problem relating to ERS operation is that the driver cannot relax completely even with the lane keeping means in operation, but must be ready to take over control at short notice to maintain a central lane position or to perform evasive action if an obstacle is located in the vehicle path. In the latter case the driver can be required to make a quick decision and may decide to leave the ERS road unnecessarily in order to prevent damage to the current collector. Depending on the current traffic density this action can lead to an undesired speed variation or braking of the vehicle, and even an unnecessary start of the internal combustion engine. Any one of these actions would result in a negative effect on travel time and fuel efficiency, and would interrupt charging of an on-board energy storage unit.

The invention aims to overcome problems relating to controlling the vehicle relative to a charging surface of the ERS if an obstacle is detected and to provide suitable means for assisting the driver in operating the vehicle in a safe manner.

It is desirable to provide a vehicle safety system, which system allows safe operation of the vehicle in case an obstacle is detected in front of the vehicle.

In the subsequent text the wording "electric road system" will be described by the abbreviation ERS. An ERS can encompass a conductive system or an inductive system. Conductive systems require direct contact between a conductor comprising two parallel rails and a corresponding collector in order to transfer DC power. Inductive systems uses electro-magnetic transmission coils embedded in the road surface and reception coils in the vehicle which coils are electrically resonant, so that they convert the magnetic flux above the road into electrical energy for use in the vehicle, wherein the energy can be used to charge batteries or drive electric motors in the vehicle.

In the text, the wording "current collector" is used, as a collective term for an arrangement that is suitable for transferring electrical power from a source of electrical energy in or on a road surface. A current collector of this type comprises a pick-up or a similar device arranged to be placed in close proximity to or in contact with a current conductor. The pick-up is attached to the vehicle via a controllable assembly that allows the pick-up to be vertically and transversely displaced relative to the vehicle. The displacement can be achieved, for instance, by an arm that can be pivoted vertically about a horizontal pivot joint towards the road surface and transversely in an arc about a vertical pivot joint, or by a holder displaced vertically along a first guide and transversely about a second guide mounted transversely to the vehicle. Consequently, when it is stated that the current collector is displaced to track a current conductor, this intended to mean that the arrangement is displaced to allow the pick-up component of the current collector to be placed in close proximity to or in contact with a current conductor.

The invention relates to a safety system for an electric road system (ERS) and aims to overcome problems relating to potential damage to the ERS pick-up during power transmission caused by obstacles on the road impacting the pick-up. The invention involves monitoring the conductive or inductive charging surface using a forward looking data collecting system and detecting obstacles on the road prior to impact. Data is transmitted to an on-board ERS controller to determine whether action should be initiated to stop charging and/or to perform a retraction to lift the pick-up. The ERS controller can also determine the level of action, that is, if it is sufficient to merely lift the pick-up or if it is required to perform a lane change or stop the vehicle.

According to a first aspect of the invention, the object is achieved by a method for controlling a vehicle safety system in a vehicle provided with a current collector arranged to transmit electric power from a current conductor located in a predetermined transverse position in the surface of a road, wherein the current collector is controllable for vertical and transverse displacement relative to a longitudinal axis of the vehicle to contact and/or track the current conductor. The safety system comprises at least one forward looking data collecting system for detecting obstacles on the road prior to impact with the current collector and an electronic control unit for controlling at least power transmission and displacement of the current collector. The method involves performing the steps of:

detecting that an obstacle is located in the path of the current collector;

transmitting data from the forward looking data collecting system to the electronic control unit;

performing an object classification to determine a damage level for the dynamic charging system based on the transmitted data;

determining an action to be taken by the safety system based on the determined damage level; and Initiating the action in dependence of at least the determined damage level.

When it is determined that the damage level exceeds a first value then the safety system initiates at least an interruption of power transmission from the current conductor. This action is performed when it is determined that an impact is imminent but a retraction of the current collector or a displacement of the vehicle may not be required at this time. For instance, if it is determined that the obstacle is too small to damage the pick-up then the pick-up or a protective device in front of the pick-up is allowed to strike and remove or pass over the obstacle. Power is interrupted merely as a safety precaution so that the current collector does not have any live components during an impact. Also, a power interruption prevents arcing if a conductive pick-up is separated from the current conductor and can also prevent undesirable current surges in the on-board electrical system. An interruption of power transmission can for instance be performed by means of a controllable contactor in a central junction box or a similar suitable device.

When it is determined that the damage level exceeds a second value, exceeding the first value, then the safety system initiates a vertical retraction of the current collector into an at least partially retracted position. This action can be performed directly or after the first level has been exceeded as a result of an update of the object classification, when it is determined that the obstacle is large enough to cause damage to the pick-up. In both cases an initial interruption of power transmission is preferably performed. Partial retraction of the current collector can be performed if it is determined that the obstacle can be avoided by allowing the pick-up to pass over the obstacle. In this case the current collector can be returned to its lowered position immediately after the obstacle and power transmission can be resumed with a minimum of delay.

When it is determined that the damage level exceeds a third value, exceeding at least the first or the second value, then the safety system initiates at least a vertical retraction of the current collector into a retracted position. This action can be performed directly or after the first or second level has been exceeded as a result of an update of the object classification, when it is determined that the obstacle is large enough to cause damage to a partially retracted pick-up. In this case, full retraction and for a transverse displacement of the current collector can be performed if it is determined that the obstacle can be avoided by allowing the pick-up to pass over or to one side of the obstacle. Although it is possible to perform a transverse displacement prior to vertical retraction, this is less desirable for a conducting current collector which can be subjected to excessive wear during, displacement. As in the above cases an initial interruption of power transmission is preferably performed. This operation allows the current collector can be returned to its lowered position immediately after passing the obstacle and power transmission can be resumed with a minimum of delay.

When it is determined that the damage level exceeds a fourth value, exceeding at least the fast value, then the safety system initiates an evasive action. This action can be performed directly or after any one of the lower damage levels have been exceeded as a result of an update of the object classification, when it is determined that the obstacle is large enough to cause damage to a fully retracted pick-up or that the obstacle can damage the vehicle itself. In this case, full retraction of the current collector and a suitable evasive action on the part of the vehicle must be performed if it is determined that the obstacle cannot be avoided by allowing the pick-up to pass over and/or to one side of the obstacle. As in the above cases an initial interruption of power transmission is preferably performed. This operation allows the current collector can be returned to its lowered position immediately after passing the obstacle and countermanding the evasive action of the vehicle, whereby power transmission can be resumed after a short delay.

In this context a suitable evasive action can be a lateral displacement of the vehicle. The lateral displacement can be performed by initiating a vehicle steering action to perform a lane change in order to move the vehicle into an adjacent lane or to move it onto a hard shoulder. Alternatively the evasive action can involve initiation of a vehicle retarding action to brake or stop the vehicle. If a lateral displacement of the vehicle is not immediately possible, then the vehicle can be slowed down to allow a lane change before reaching the obstacle. If a lateral displacement of the vehicle is not possible then the vehicle can be braked and stopped before reaching the obstacle.

In the above examples the data transmitted from the forward looking data collecting system to the electronic control unit is used for determining an estimated time to impact with a detected obstacle. Any action taken is initiated in dependence of the estimated time to impact.

According to a second aspect of the invention, the object is achieved by a vehicle comprising a safety system for a current collector arranged to transmit electric power from a current conductor located in a predetermined transverse position in the surface of a road. The current collector is arranged to be controllable for vertical and transverse displacement relative to a longitudinal axis of the vehicle, in order to maintain optimal contact with the current conductor and/or track the current conductor. The safety system comprises at least one forward looking data collecting system for detecting obstacles on the road prior to impact with the current collector and an electronic control unit for controlling at least power transmission in and displacement of the current collector. A suitable in-vehicle forward looking data collection system can comprise one or more of e.g. a radar or a lidar system, a laser system, an ultrasonic system, a camera system, or a similar data collection system suitable for use in a vehicle collision avoidance system or a lane keeping system.

The at least one forward looking data collecting system is arranged to detect that an obstacle is located in the path of the current collector and to transmit data from the forward looking data collecting system to the electronic control unit. The electronic control unit is arranged to perform an object classification to determine a damage level for the current collector based on the transmitted data and to determine a suitable action to be taken by the safety system based on the determined damage level. The electronic control unit is subsequently arranged to initiate the action in dependence of at least the determined damage level.

According to a first example, the electronic control unit is arranged to at least interrupt power transmission through the current collector, if the determined damage level indicates that the obstacle is in the path of the current collector. This action is performed when it is determined that an impact is imminent but a retraction of the current collector or a displacement of the vehicle may not be required at this time.

According to a further example, the electronic control unit is arranged to at least partially retract the current collector if the determined damage level indicates damage to the current collector in a current transmitting position. This action can be performed directly or after the first level has been exceeded as a result of an update of the object classification, when it is determined that the obstacle is large enough to cause damage to the pick-up. In both cases an initial interruption of power transmission is preferably performed. Partial retraction of the current collector can be performed if it is determined that the obstacle can be avoided by allowing the pick-up to pass over the obstacle. Full retraction of the current collector can be performed if it is determined that the obstacle is large enough to cause damage to a partially retracted pick-up and/or a transversely displaced pick-up.

According to a further example, the electronic control unit is arranged to initiate an evasive steering and/or retarding action if the determined damage level indicates damage to the current collector in a retracted position. This action can be performed directly or after any one of the lower damage levels have been exceeded as a result of an update of the object classification, when it is determined that the obstacle is large enough to cause damage to a fully retracted pick-up or that the obstacle can damage the vehicle itself. A suitable evasive action can be a lateral displacement of the vehicle or a vehicle retarding action to brake or stop the vehicle.

The invention provides an arrangement for preventing damage to the pick-up causing debris to be scattered over the road. The arrangement also assists the driver in avoiding obstacles and avoids damage to the pick-up that would normally require repairs. By assessing data from the forward looking data collecting system and determining damage levels based on the data a suitable action can be taken by the safety system. When the obstacle is too small to damage the pick-up or if it can be avoided by performing a partial or full retraction of the pick-up, possibly combined with a transverse displacement, it is possible to avoid unnecessary evasive action and thereby minimize negative effects on travel time, fuel efficiency and/or charging of an on-board energy storage unit. The workload on the driver would also be reduced, as the safety system can make a faster and more accurate decision about suitable action to be taken by utilizing data from the in-vehicle forward looking data collection system.

The present invention also relates to a computer program comprising program code means for performing the steps of the above method for controlling a vehicle safety system when said program is run on a computer. The present invention further relates to a computer readable medium carrying a computer program comprising program code means for performing the steps of the above method for controlling a vehicle safety system when said program product is run on a computer. The present invention further relates to a control unit for controlling a vehicle safety system, the control unit being configured to perform the steps of the method.

Further advantages and advantageous features of the invention are disclosed in the following description and in the dependent claims.

BRIEF DESCRIPTION OF THE DRAWINGS

In the following text, the invention will be described in detail with reference to the attached drawings. These schematic drawings are used for illustration purposes only and do not in any way limit the scope of the invention.

In the drawings.

DETAILED DESCRIPTION

Figure 1A:
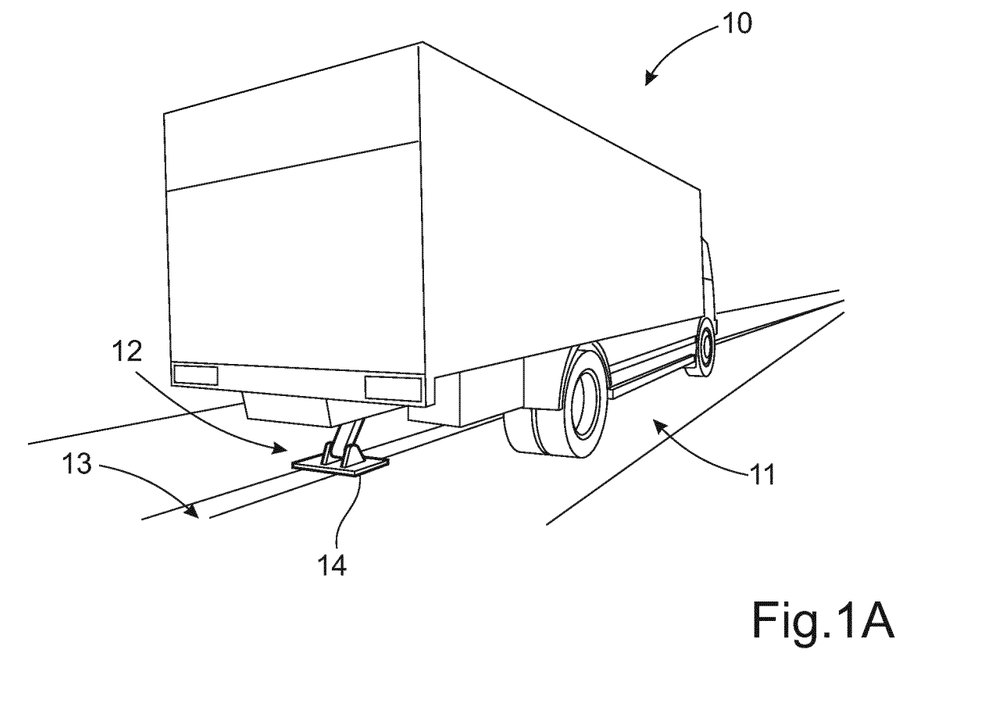
FIG. 1A shows a schematic electric road system according to the invention.

FIG. 1A shows a schematic electric road system (ERS) where a vehicle 10 is travelling on a road 11 provided with means for supplying electric current to the vehicle 10. The vehicle 10 is provided with a power collecting arrangement 12 which can be lowered into contact with a current conductor 13 located in the surface of the road 11. The vehicle can be an electric vehicle or a hybrid electric vehicle.

The power collecting arrangement 12 comprises a current collector 14 arranged to be displaced between a retracted, inactive first position and an operative second position in contact with the current conductor 13 using suitable actuators (not shown). FIG. 1A shows the current collector in its operative position. Positioning means is provided for moving the current collector 14 at least in the vertical direction of the vehicle.

In this context the positioning means will be described as a displaceable arm or holder for the current collector, which arm can be displaced vertically either in a straight line or in an arcuate path relative to a pivot with a horizontal axis on the vehicle. The positioning means for such an arm can also comprise actuator means for displacing the arm in the transverse direction of the vehicle, either in a straight line or in an arcuate path relative to a pivot with a vertical axis on the vehicle. Alternatively, the transverse positioning means can comprise suitable control means connected to an electronically controllable steering, system in the vehicle, wherein lateral positioning of the vehicle relative to the electrical conductor can be performed using a pair of steerable wheels. Positioning can further be performed using a combination of the above means, for instance if the vehicle roust be displaced in the lateral direction to bring the current conductor within the transverse range of the displaceable arm carrying the current collector. The design of the power collecting arrangement will not be described in further detail here.

Figure 1B:
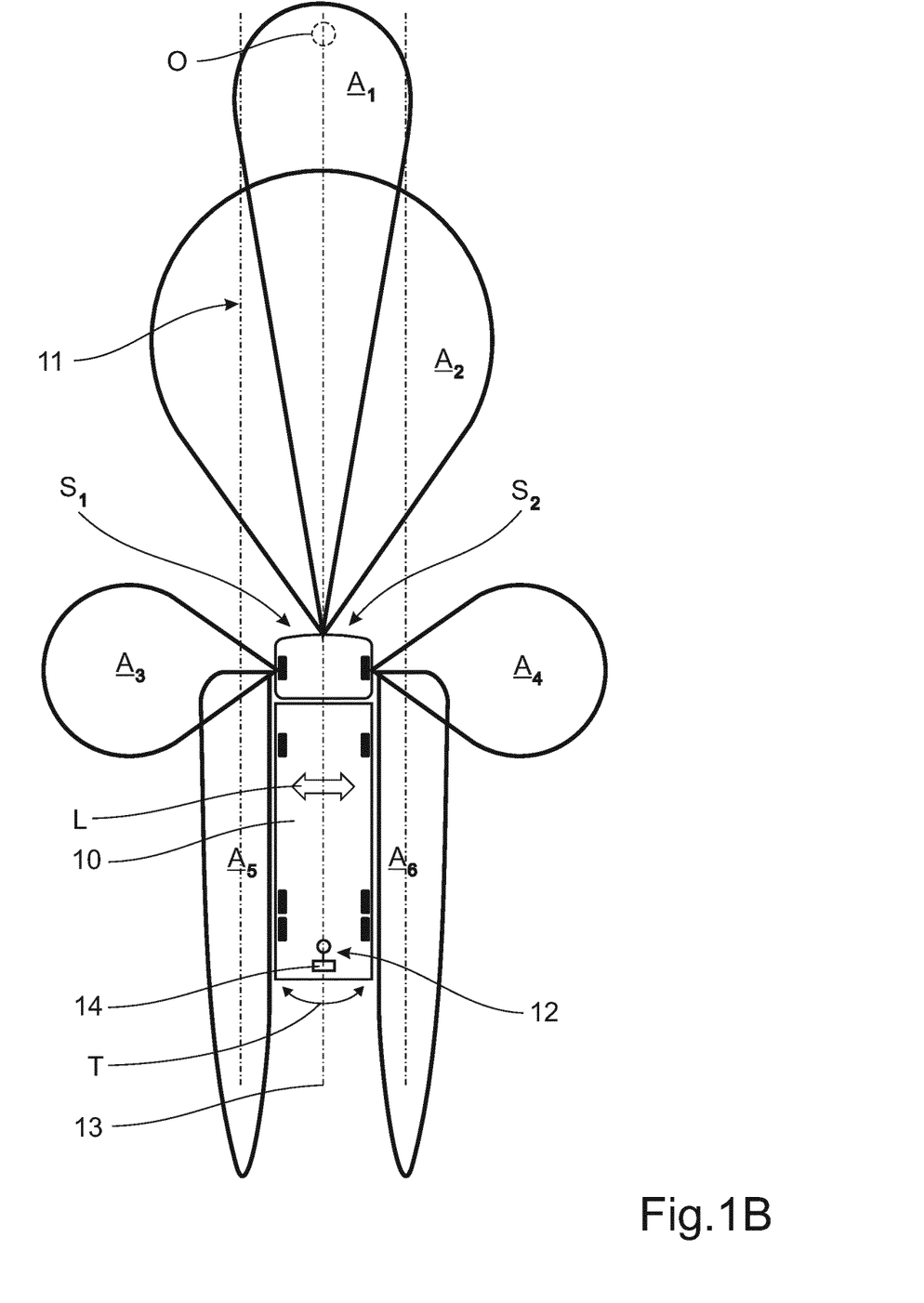
FIG. 1B shows a schematic plan view of the vehicle in FIG. 1A.

FIG. 1B shows a schematic plan view of the vehicle in FIG. 1A. The figure illustrates the vehicle 10 with the power collecting arrangement 12 which can be lowered into contact with the current conductor 13 located in the surface of the road 11. The road 11 has a predetermined width and the current conductor 13 is located in a predetermined position in the surface of the road 11, a predetermined lateral distance from one side edge of the road 11. The vehicle 10 is provided with a safety system comprising an in-vehicle forward looking data collection system comprising multiple sensors, such as at least one forward looking sensor array covering one or more areas A1, A2 in front of the vehicle. Additional sensors can include side sensors covering areas A3, A4 in the lateral direction of the vehicle and rearward looking sensor arrays covering areas A5, A6 to the rear of the vehicle. Suitable sensors for this purpose are e.g. a radar or tidal (ladar) system, a laser system, an ultrasonic system, a vision or stereo camera system, or a similar suitable data collection system for use in a vehicle collision avoidance system or a lane keeping system. A forward looking sensor array can comprise a radar-based system that uses a forward facing millimeter-wave radar, a Lidar or ladar-based system, a vision or stereo camera system or a combination of such systems to provide a sensor fusion between e.g. a vision sensor and a radar sensor.

The example in FIG. 1B shows at vehicle with forward looking Lidar sensors comprising a long range sensor S1 covering a first area A1 and a short range sensor S2 covering a second area A2. The sensors can be mounted side-by-side or vertically or laterally separated for detecting and identifying obstacles, in order to identify a potential collision with the current collector 14 or the vehicle 10. The Lidar sensors can be incorporated into a headlight or other auxiliary lamp assembly. The Lidar sensors can also be part of a rearview mirror assembly, or be mounted behind an opening in a bumper or grille assembly, or can be high mounted on a vehicle door or roof support, or a similar suitable vehicle position.

The forward looking sensor arrays S1, S2 covering areas A1, A2 in front of the vehicle 10 are used to detect an obstacle O located in the path of the current collector 14. The output signals from the sensors S1, S2 are used for at least a 2D image generation, more preferably a 3D image generation in order to identify and/or recognize objects and obstacles, as well as for determining the extension and/or size of the object or obstacle O in the path of the current collector 14. The forward looking Lidar sensors connected to a central electronic control unit which synthesizes the available data from each of the independent Lidar sensors into a composite 3D map describing objects and obstacles on a closing path with the host vehicle. Alternatively, conventional 2D still images or video sequences may be used to improve the quality of generated 3D solid models and scene maps.

Figure 2:
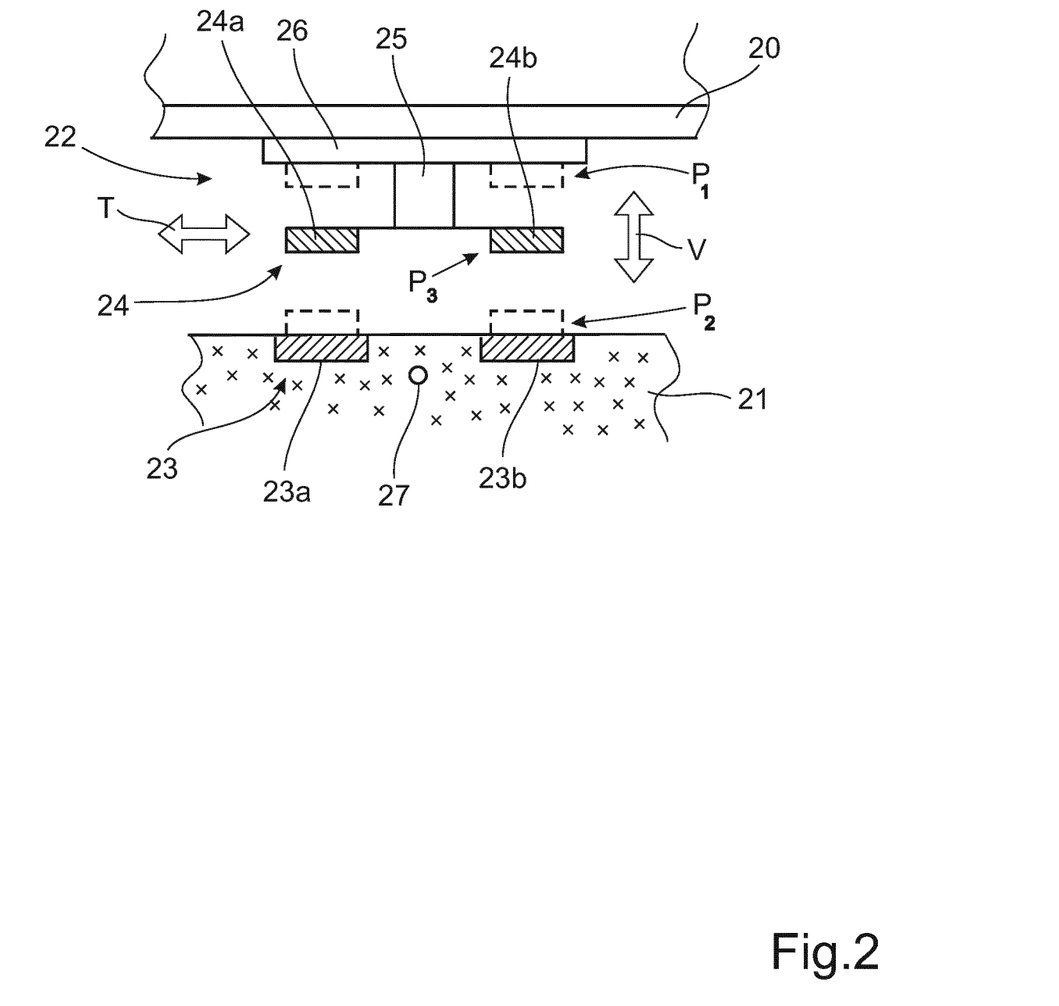
FIG. 2 shows a schematic front view of a power collecting arrangement according to the invention.

FIG. 2 shows a schematic front view of a power collecting arrangement 22 according to one example of the invention. The power collecting arrangement 22 is mounted on a schematically indicated vehicle 20 located over a schematic section of a road 21. A current conductor 23 comprising a first and a second power rail 23a, 23b for supplying DC current is located in the surface of the road 21. The power collecting; arrangement 22 comprises a current collector 24 with a first and a second contactor 24a, 24b for collecting current from the respective first and second power rails 23a, 23b. The current collector 24 is attached to a vertical positioning means 25 for displacing the current collector 24 from a retracted first position P1 adjacent the vehicle 20 to an active second position P2 in contact with the current conductor 23. The vertical displacement is indicated by the arrow V. The lowering of the current collector 24 into the active, second position is performed when it is detected that the first and second contactors 24a, 24b are vertically aligned with their respective first and second power rails 23a, 23b.

FIG. 2 the current collector 24 is shown in an optional intermediate position P3, The current collector 24 can be displaced vertically to the intermediate position P3 between the first and second positions P1, P2 in order to locate the current conductor 23 prior to lowering the current collector 24 into the second position P2. Alternatively the current collector can be displaced in a continuous movement from the first position, past the intermediate position, and into the second position.

In the example shown in FIG. 2, the current collector 24 and the vertical positioning means 25 are attached to a transverse positioning means 26. The vertical positioning means 26 is arranged to displace the current collector 24 and the vertical positioning means 25 in the transverse direction of the vehicle 20 as indicated by the arrow T. The transverse positioning means 26 is controlled to displace the current collector 24 in the transverse direction of the vehicle 20, initially to locate and subsequently to track the current conductor 23. Tracking is performed to maintain the first and second contactors 24a, 24b in vertical alignment with their respective first and second power rails 23a, 23b. According to the example in FIG. 2, locating and tracking the current conductor 23 is performed by using one or more vertical antennas (not shown) used for detecting the position of a signal cable 27 located between or adjacent the current conductor 23. However, the invention is not limited to this method of locating the current conductor.

Figure 3A:
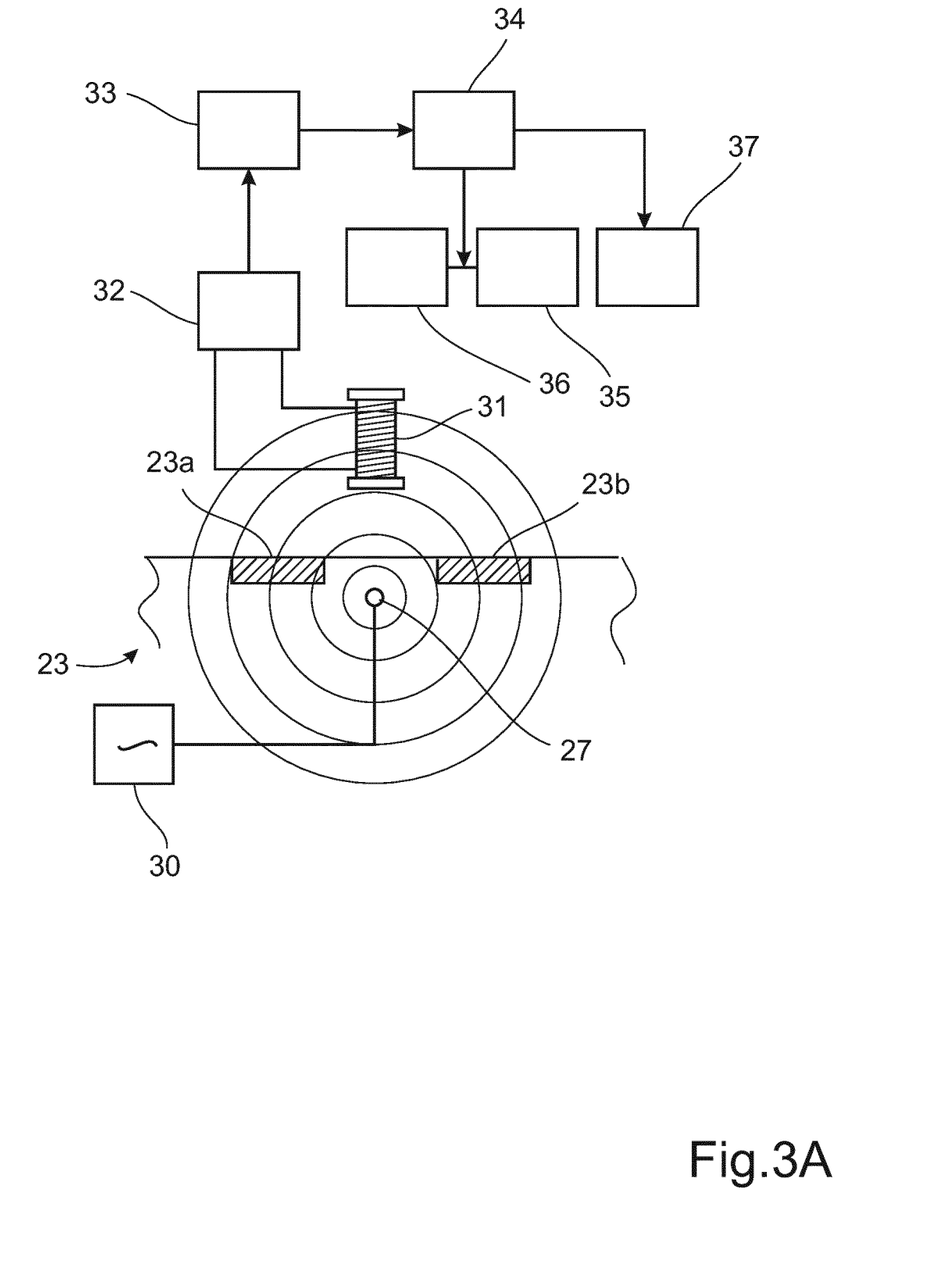
FIG. 3A shows a schematic diagram of a control arrangement for controlling a positioning means.

FIG. 3A shows a schematic diagram of a control arrangement for controlling a positioning means as described above for locating and tracking a first and a second power rail 23a, 23b. The control arrangement comprises a first detecting means 31 in the form of a vertical antenna that is preferably mounted at a suitable location on or adjacent a current collector for instance on the pick-up 24 (see FIG. 2). FIG. 3A shows a single vertical antenna 31, but multiple antennas or proximity sensors could be used to form a sensor array having increased accuracy and/or range. The vertical antenna 31 is connected to a signal receiver 32 for detecting a signal induced into the vertical antenna 31. An output signal from the signal receiver 32 is transmitted to an electronic control unit (ECU) 33, which is arranged to process, the output signal and generate control signals to a position controller 34. The position controller 34 is arranged to determine at least the required displacement to be performed by a vertical actuator 35 and a transverse actuator 36 in order to move the current collector into alignment with the first and second power rails 23a, 23b of the current conductor 23.

According to an alternative example, the transverse actuator 36 can be eliminated or supplemented by an optional vehicle steering actuator 37. The vehicle steering actuator 37 can be used instead of the transverse actuator 36 for moving the vehicle in the transverse direction of the current conductor. According to a further alternative example, the vehicle steering actuator 37 can be used together with the transverse actuator 36 for autonomous lateral movement of the vehicle if the current conductor 23 is not within the displaceable range of the transverse actuator 36 and/or for maintaining a desired lateral position on the road. According to a further alternative example, the vehicle is steered manually whereby the driver can receive an audible, a visual and/or a haptic warning signal from the ECU 33 indicating that the vehicle has deviated a predetermined distance from the desired position and that a steering correction is required.

In operation the vertical antenna 31 will monitor the presence or absence of a predetermined signal transmitted from a signal cable 27 located in the road at a predetermined location relative to the first and second power rails 23a, 23b. The signal is generated by a signal generator 30 connected to the signal cable 27 and has a predetermined signal characteristics. When the vertical antenna 31 is within range the signal will be induced into the vertical antenna 31 and detected by the signal receiver 32. In response to the detected signal transmitted from the receiver to the ECU 33, the ECU 31 will determine if the current collector should be deployed, lowered into its active position or be retracted. The output from the signal receiver 31 contains data relating to signal strength and amplitude, as well as the phase characteristics of the signal which data is continuously processed by the ECU 33. In response to the received signal data the ECU 33 transmits control signals to the position controller 34, which determines the required displacement for each of the vertical and the transverse actuators 36, 35 for maintaining the current collector in lateral alignment with the current conductor. When the signal ceases, for instance at the end of an ERS road, the ECU 33 will transmit a signal to the position controller 34 to actuate the vertical actuator 35 and retract the current collector.

An alternative power conducting system can be a current conductor comprising inductive loops buried in the road surface which loops would generate a magnetic field to supply the vehicle with energy without the need for a contacting current collector. This contactless transfer of energy is enabled by an electric current flowing through the conductor to generate a magnetic field. In the case of an alternating current (AC), this induces a voltage in a second conductor on the vehicle, even though the two conductors are not in contact with one another. Using precisely controlled frequencies of the applied alternating current, high-efficiency energy transmission from the sending to the receiving electrical circuits is ensured. The principles for locating an inductive current conductor would be substantially the same as for the power rail arrangement described in connection with FIG. 2.

Figure 3B:
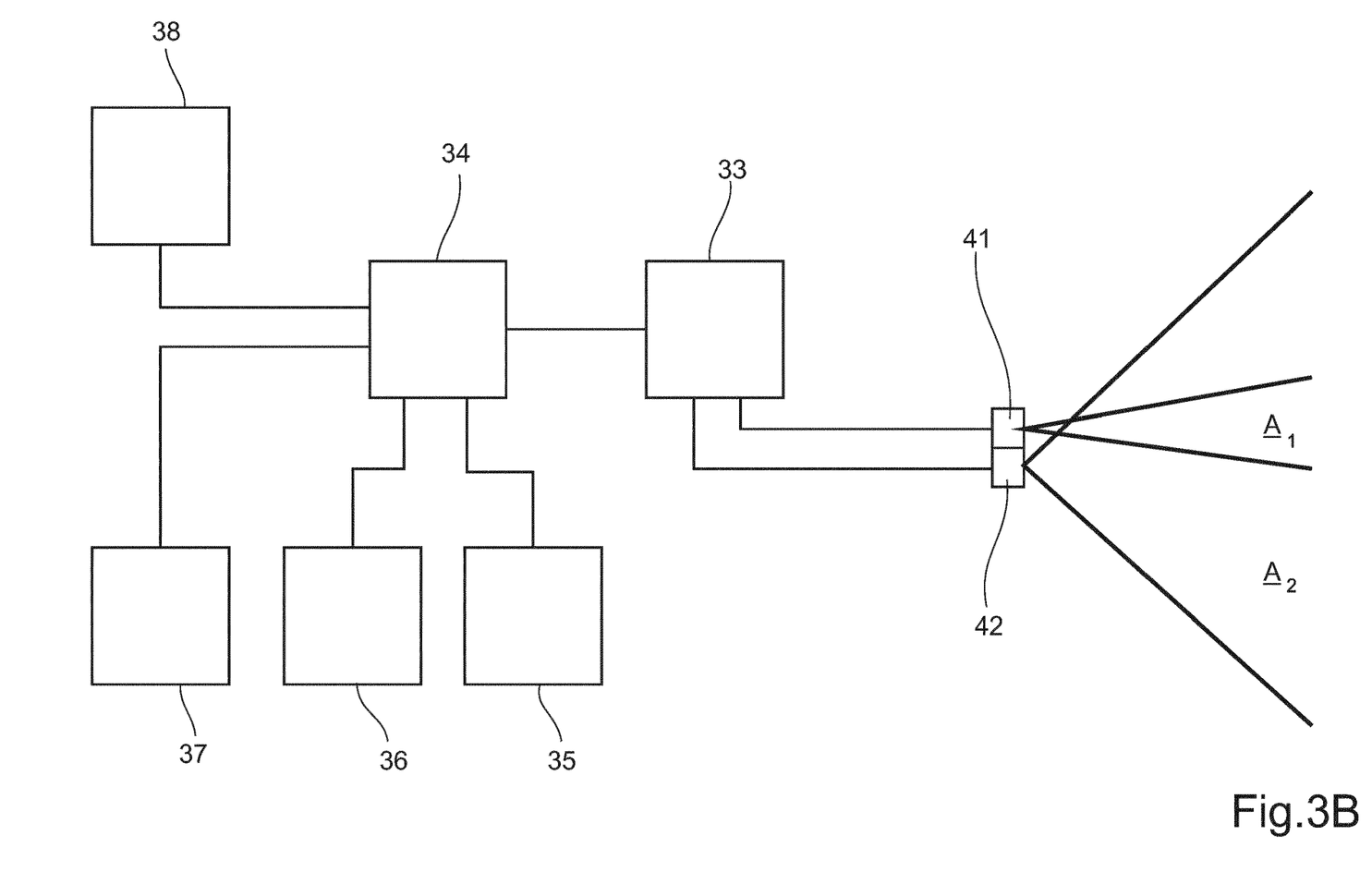
FIG. 3B shows a schematic diagram of a control arrangement for controlling a safety system according to the invention.

FIG. 3B shows a schematic diagram of a control arrangement for controlling a safety system according to the invention. The control arrangement comprises forward looking sensor arrays 41, 42 covering areas A1, A2 in front of the vehicle 10 (FIG. 1B) for detecting an obstacle O located in the path of the current collector 14. The output signals horn at least one sensor 41, 42 is transmitted to an electronic control unit (ECU) 33 drat performs at least a 2D image generation, n ore preferably a 3D image generation, in order to identify and/or recognize objects and obstacles, as well as for determining the extension and/or size of the object or obstacle O in the path of the current collector 14.

Subsequently the electronic control unit 33 will perform an initial object classification to determine a damage level for the dynamic charging system based on the transmitted data and the subsequent processing of this data. Depending on the determined damage level the electronic control unit 33 will determine an action to be taken by the safety system based on the determined damage level and initiate the action in dependence of at least this initially determined damage level. The obstacle is initially monitored by the first sensor array 41 and later by the second sensor array 42 when the obstacle comes into sensor range. The transmitted data from the sensor arrays 41, 42 is continuously evaluated by the electronic control unit 33 to determine whether the initial object classification was correct and whether a correction of the determined damage level is required.

If it is determined that the damage level is low then the safety system initiates at least an interruption of power transmission from the current conductor. This action is performed when it is determined that an impact is imminent but a retraction of the current collector or a displacement of the vehicle may not be required If it is determined that the damage level is intermediate, exceeding the low level, then the safety system initiates a vertical retraction of the current collector into an at least partially retracted position. The intermediate level can be divided into sub-levels depending on the threat posed by the object, which sub-level can determine if a full or a partial retraction is required. This action can be performed directly or after the low level has been exceeded as a result of an update of the object classification, when it is determined that the obstacle is large enough to cause damage to the pick-up. Partial retraction of the current collector can be performed if it is determined that the obstacle can be avoided by allowing the pick-up to pass over or to one side of the obstacle. An initial interruption of power transmission is preferably performed prior to retraction.

If it is determined that the damage level is high, exceeding all other levels, then the safety system initiates an evasive action. This action can be performed directly or after any one of the lower damage levels have been exceeded as a result of an update of the object classification, when it is determined that the obstacle is large enough to cause damage to a fully retracted pick-up or that the obstacle can damage the vehicle itself. In this case, full retraction of the current collector and a suitable evasive action on the part of the vehicle must be performed if it is determined that the obstacle cannot be avoided by allowing the pick-up to pass over and/or to one side of the obstacle. An initial interruption of power transmission is preferably performed prior to retraction and vehicle displacement.

Depending on the determined damage level the electronic control unit 33 will interrupt power transmission and generate control signals to a position controller 34. The position controller 34 is arranged to determine at least the required displacement to be performed by a vertical actuator 35 and a transverse actuator 36 in order to move the current collector into a desired retracted position. If evasive action is required the electronic control unit 33 will generate control signals to a vehicle steering actuator 37 for autonomous lateral movement of the vehicle into an adjacent lane or onto a hard shoulder. If lateral evasive action is not possible or not immediately available, then the electronic control unit 33 will generate control signals to a vehicle braking actuator 38 for autonomous braking of the vehicle.

According to an alternative example, the vehicle is steered manually during an evasive action whereby the driver can receive an audible, a visual and/or a haptic warning signal from the ECU 33 indicating that a steering correction is required to displace the vehicle laterally to avoid an obstacle. Similarly, if a steering action is not possible, the driver can receive an audible, a visual and/or a haptic warning signal indicating that braking is required to slow down or stop the vehicle to avoid impact with an obstacle.

Figure 4:
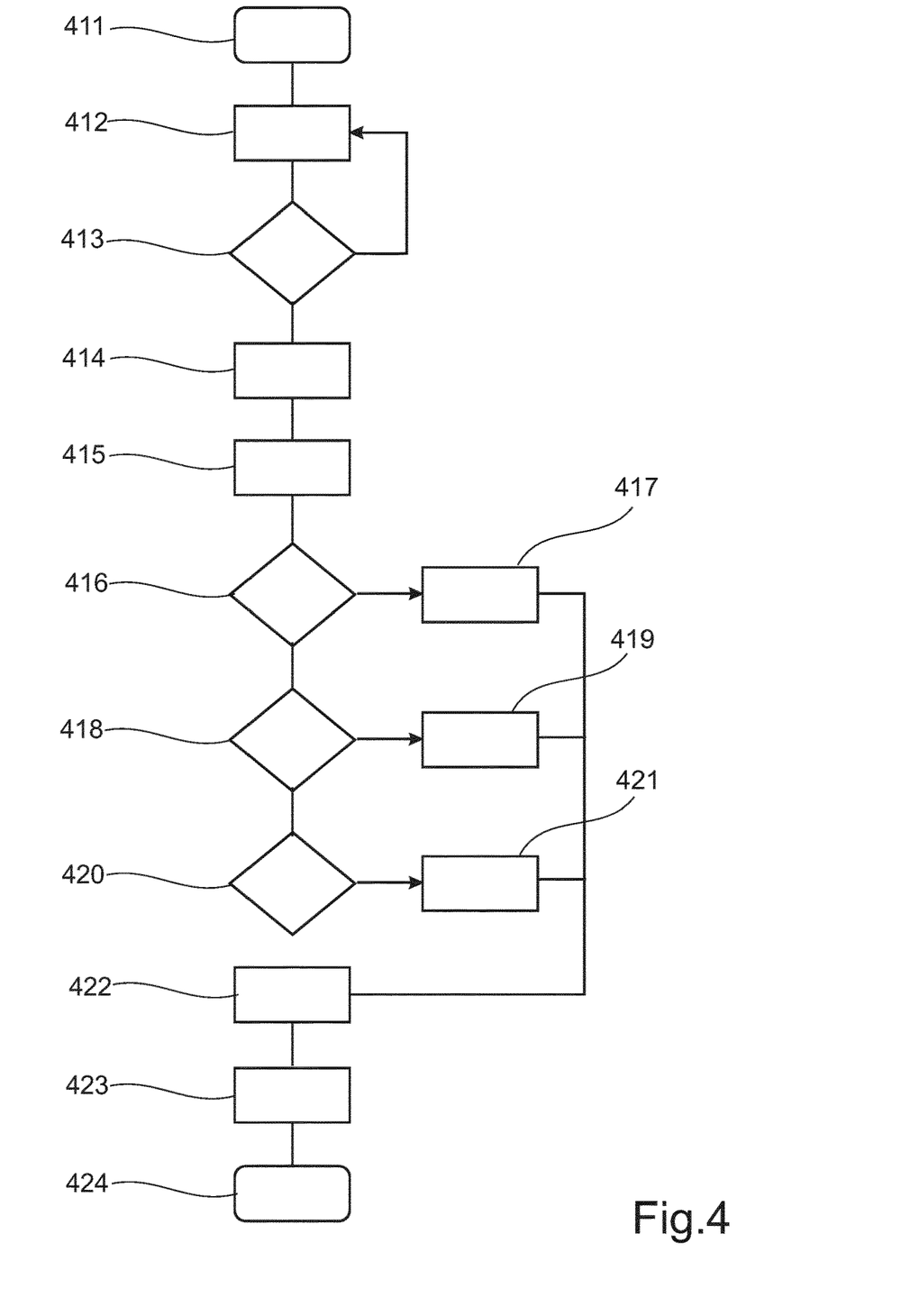
FIG. 4 shows a schematic flow diagram illustrating the operation of a safety system according to the invention.

FIG. 4 shows a schematic flow diagram illustrating the operation of a safety system according to the invention. The flow diagram will be described with reference to FIGS. 1-3B.

In operation, the method is initiated in a first step 411 when the vehicle 10 enters an ERS road, causing the current collector 14 to be lowered into the second position P2 to transmit electric power from the current conductor 13, 23 to the vehicle. In a subsequent step 412 the forward looking sensor array 41 covering area A1 in front of the vehicle 10 will monitor the road ahead of the vehicle for obstacles O located in the path of the current collector 14. In a subsequent step 413 it is determined whether au object has been detected or not. As long as no obstacles are detected, monitoring is continued in the previous step 412. However, if an obstacle is detected, then the sensor array 41 transmits data to an electronic control unit 33 (see FIGS. 3 & 4) in the next step 414. The electronic control unit 33 performs an object identification using 3D image generation in order to identify and/or recognize the obstacle O and, if possible, determine the longitudinal and lateral extension and/or size of the object or obstacle. In a subsequent step 415 the electronic control unit 33 will perform an initial object classification to determine a damage level for the dynamic charging system based on the transmitted data and the subsequent processing of this data.

Depending on the determined damage level the electronic control unit 33 will determine an action to be taken by the safety system based on the determined damage level and initiate the action in dependence of at least this initially determined damage level. The obstacle is initially monitored by the first sensor array 41 and later by the second sensor array 42 when the obstacle comes into sensor range. The transmitted data from the sensor arrays 41, 42 is continuously evaluated by the electronic control unit 33 to determine whether the initial object classification was correct and whether a correction of the determined damage level is required.

In a subsequent step 416, if it is determined that the damage level is high and that the current collector and the vehicle would be damaged by an impact with the obstacle, then the electronic control unit 33 is arranged to perform a further step 417 involving interruption of power transmission through the current collector 14 and initiate an evasive action. These actions can be performed directly, or after any one of a lower or intermediate damage level has been exceeded as a result of an update of the object classification, where it is determined that the obstacle is large or heavy enough to cause damage to a fully retracted pickup or that the obstacle can damage the vehicle itself. The timing of the power interruption can be dependent on the determined damage level. For instance, if the damage level is high, then the vehicle may have to leave the ERS which requires power transmission to be interrupted quickly in order to allow sufficient time for avoiding the obstacle. Evasive action is likely to be performed after a relatively large obstacle has been detected by the first sensor array 41 which has a relatively long range. It is desirable to detect larger obstacles early in order to give the ECU 33 sufficient time to either prepare a lane change and or brake the vehicle before reaching the obstacle. Power interruption is maintained until the current collector has passed the obstacle. If it is determined that the damage level is not high then the process bypasses steps 416 and 417.

In a subsequent step 418, if it is determined that the damage level is intermediate and that the current collector would be damaged by an impact with the obstacle, then the electronic control unit 33 is arranged to perform a further step 419 involving interruption of power transmission through the current collector 14 and initiate a retraction of the current collector. The timing of the power interruption can be dependent on the determined damage level. For instance, if the damage level is intermediate, then the power transmission must be interrupted in order to allow sufficient time for displacing the current collector to avoid the obstacle. A decision to retract the current collector partially or fully is made on the basis of the damage level and the object identification, which will give an approximate height and width, and also a transverse extension of the obstacle. At this point an additional decision can be made to perform a transverse displacement of the current collector to pass the obstacle to one side. This action can be performed directly or after an initial low level has been exceeded as a result of an update of the object classification where it is determined that the obstacle is large enough to cause damage to the pick-up. Power interruption is maintained until the current collector has passed the obstacle.

In a subsequent step 420, if it is determined that the damage level is relatively low and that the current collector would not be damaged by an impact with the obstacle, then the electronic control unit 33 is arranged to perform a further step 421 involving interruption power transmission through the current collector 14, as the determined damage level indicates that the obstacle is in the path of the current collector. If the damage level is low then no displacement of the current collector and its pick-up is required and the timing of the interruption of power transmission can be delayed to a time immediately prior to impact with the obstacle. Power interruption is maintained until the current collector has passed the obstacle.

Once the damage level has been determined and the appropriate action has been taken in response to this level, the electronic control unit 33 will monitor the data transmitted from the sensors 41, 42 in a further step 422 in order to determine that the vehicle has passed the obstacle. When the vehicle has passed the obstacle the process proceeds to the next step 23 where normal ERS operation is resumed. The reversal of the action performed in response to a determined damage level is reversed, whereby the vehicle re-joins the ERS, lowers the current collector and/or reconnects power transmission. In a final step 424 it is determined whether the vehicle is still travelling on an ERS road and the process returns to the first step 411 to monitor for additional obstacles.

The present invention also relates to a computer program, computer program product and a storage medium for a computer all to be used with a computer for executing the method as described in any one of the above examples.

Figure 5:
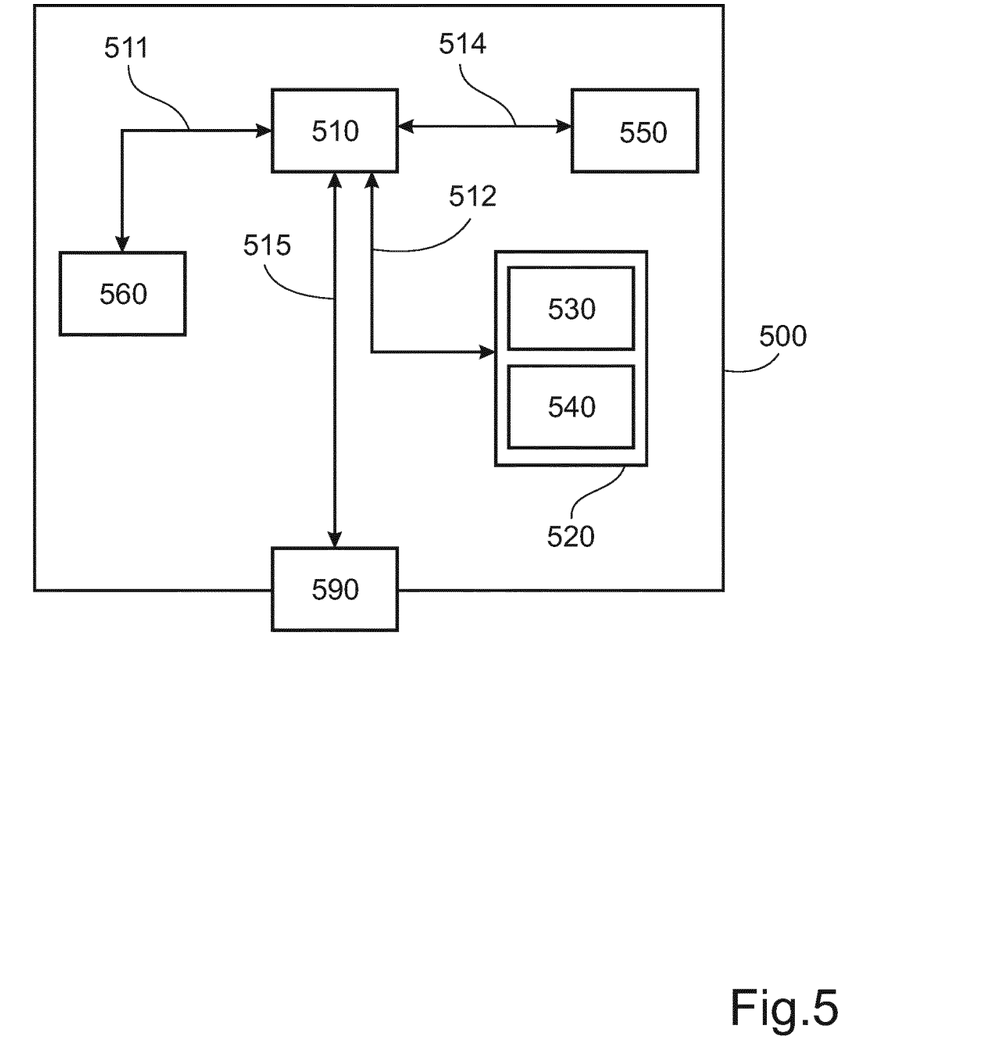
FIG. 5 shows the invention applied on a computer arrangement.

FIG. 5 shows an apparatus 500 according to one embodiment of the invention, comprising a non-volatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system. The apparatus 500 can be enclosed in, for example, a control unit, such as the control unit 33 (FIG. 3B). The data-processing unit 510 can comprise, for example, a microcomputer. The memory 520 also has a second memory part 540, in which a program for controlling the vehicle safety system function according to the invention is stored. In an alternative embodiment, the program for controlling the vehicle safety system is stored in a separate non-volatile storage medium 550 for data, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the non-volatile storage medium 550. The data-processing unit 510 is tailored for communication with the storage memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515. The method according to the present invention can be executed by the data-processing unit 510, by the data-processing unit 510 running the program stored in the memory 540 or the program stored in the non-volatile storage medium 550.

It is to be understood that the present invention is not limited to the embodiments described above and illustrated in the drawings; rather, the skilled person will recognize that many changes, variants and modifications may be made within the scope, of the appended claims.

The invention claimed is:

1. Method for controlling a vehicle safety system in a vehicle provided with a current collector arranged to transmit electric power from a current conductor located in a predetermined transverse position in a surface of a road, wherein the current collector is controllable for vertical and transverse displacement relative to a longitudinal axis of the vehicle to contact and track the current conductor, a safety system comprising; at least one forward looking data collecting system for detecting obstacles on the road prior to impact with the current collector; and an electronic control unit for controlling at least power transmission and displacement of the current collector; comprising: detecting that an obstacle is located in a path of the current collector; transmitting data from the forward looking data collecting system to the electronic control unit; performing an object classification to determine a damage level for a dynamic charging system based on the transmitted data; determining an action to be taken by the safety system based on a determined damage level; and initiating the action in dependence of at least the determined damage level when the damage level exceeds a threshold value, wherein the safety system initiates at least one of an interruption of power transmission from the current conductor; and a vertical retraction of the current collector into an at least partially retracted position when the damage level exceeds the threshold value.

2. The method according to claim 1, comprising determining that the damage level exceeds a second threshold value, exceeding at least the threshold value, wherein a safety system initiates at least the vertical retraction of the current collector into a retracted position.

3. The method according to claim 1, comprising determining that the damage level exceeds a third threshold value, exceeding at least the threshold value, wherein a safety system initiates an evasive action.

4. The method according to claim 1, comprising initiating an additional action involving a vehicle steering action to perform a lane change.

5. The method according to claim 1, comprising initiating an additional action involving the vehicle retarding action to brake or stop the vehicle.

6. The method according to claim 1, comprising initiating the action in dependence of an estimated time to impact based on the transmitted data.

7. A vehicle comprising a safety system for a current collector arranged to transmit electric power from a current conductor located in a predetermined transverse position in a surface of a road, wherein the current collector is arranged to be controllable for vertical and transverse displacement relative to a longitudinal axis of the vehicle, in order to maintain optimal contact, with a conductor and/or track the current conductor; the safety system comprising; at least one forward looking data collecting system for detecting obstacles on the road prior to impact with the current collector; and an electronic control unit for controlling at least power transmission in and displacement of the current collector; wherein that the at least one forward looking data collecting system is arranged to detect that an obstacle is located in a path of the current collector and to transmit data from the forward looking data collecting system to the electronic control unit; that the electronic control unit is arranged to perform an object classification to determine a damage level for the current collector based on transmitted data and to determine an action to be taken by the safety system based on a determined damage level; and that the electronic control unit is arranged to initiate the action in dependence of at least the determined damage level when the damage level exceeds a threshold, wherein the safety system initiates at least one of an interruption of power transmission from the current conductor; and a vertical retraction of the current collector into an at least partially retracted position when the damage level exceeds the threshold.

8. The vehicle according to claim 7, wherein the electronic control unit is arranged to at least interrupt power transmission through the current conductor, if the determined damage level indicates that the object is in the path of the current collector.

9. The vehicle according to claim 7, wherein that the electronic control unit is arranged to at least partially retract the current collector if the determined damage level indicates damage to the current collector in a current transmitting position.

10. The vehicle according to claim 7, wherein that the electronic control unit is arranged to initiates an evasive steering and/or retarding action if the determined damage level indicates damage to the current collector in a retracted position.

11. A computer comprising a computer program for performing the steps of claim 1 for controlling the vehicle safety system when the computer program is run on the computer.

12. A non-transitory computer readable medium carrying a computer program for performing claim 1 for controlling the vehicle safety system when the computer program is run on a computer.

13. A control unit for controlling a vehicle safety system, the control unit being configured to perform the steps of:
controlling the vehicle safety system with a current collector arranged to transmit electric power from a current conductor located in a predetermined transverse position in a surface of a road, wherein the current collector is controllable for vertical and transverse displacement relative to a longitudinal axis of a vehicle to contact and track the current conductor, a safety system comprising; at least one forward looking data collecting system for detecting obstacles on the road prior to impact with the current collector; and an electronic control unit for controlling at least power transmission and displacement of the current collector; comprising: detecting that an obstacle is located in a path of the current collector; transmitting data from the forward looking data collecting system to the electronic control unit; performing an object classification to determine a damage level for a dynamic charging system based on the transmitted data; determining an action to be taken by the safety system based on a determined damage level; and initiating the action in dependence of at least the determined damage level when the damage level exceeds a threshold, wherein the safety system initiates at least one of an interruption of power transmission from the current conductor; and a vertical retraction of the current collector into an at least partially retracted position when the damage level exceeds the threshold.

* * * * *